R. DAVIS.
SENSITOMETER FOR TESTING WITH ACCURACY THE SPEED, LATITUDE, AND COLOR SENSITIVITY OF PHOTOGRAPHIC PLATES AND FILMS.
APPLICATION FILED DEC. 15, 1920.
1,382,272.
Patented June 21, 1921.
5 SHEETS—SHEET 4.
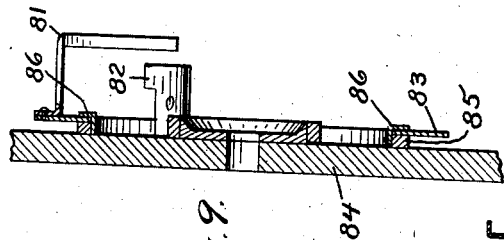
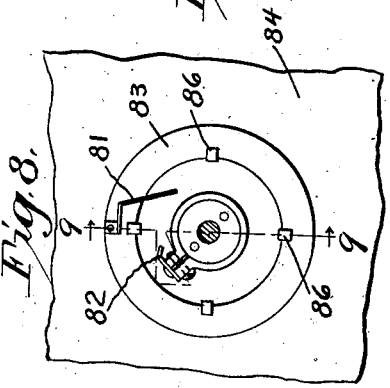
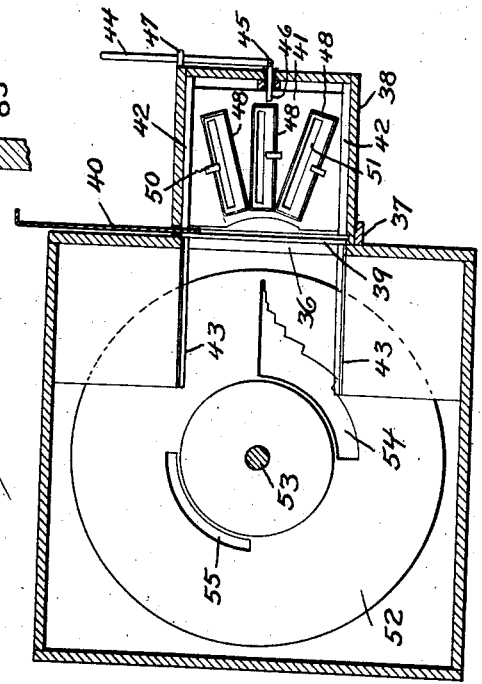
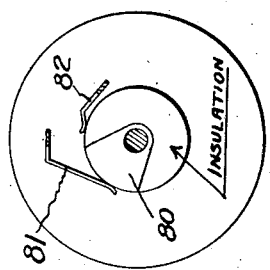
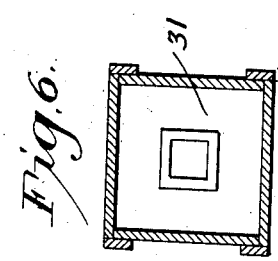
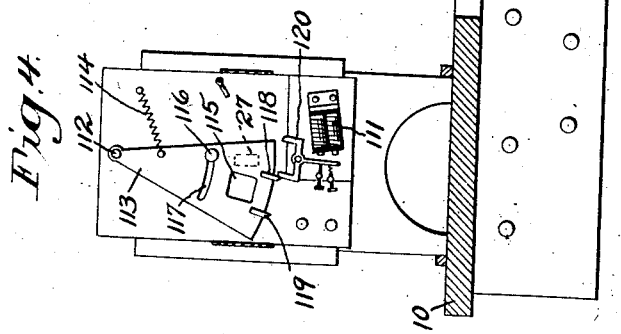
Inventor:
Raymond Davis.

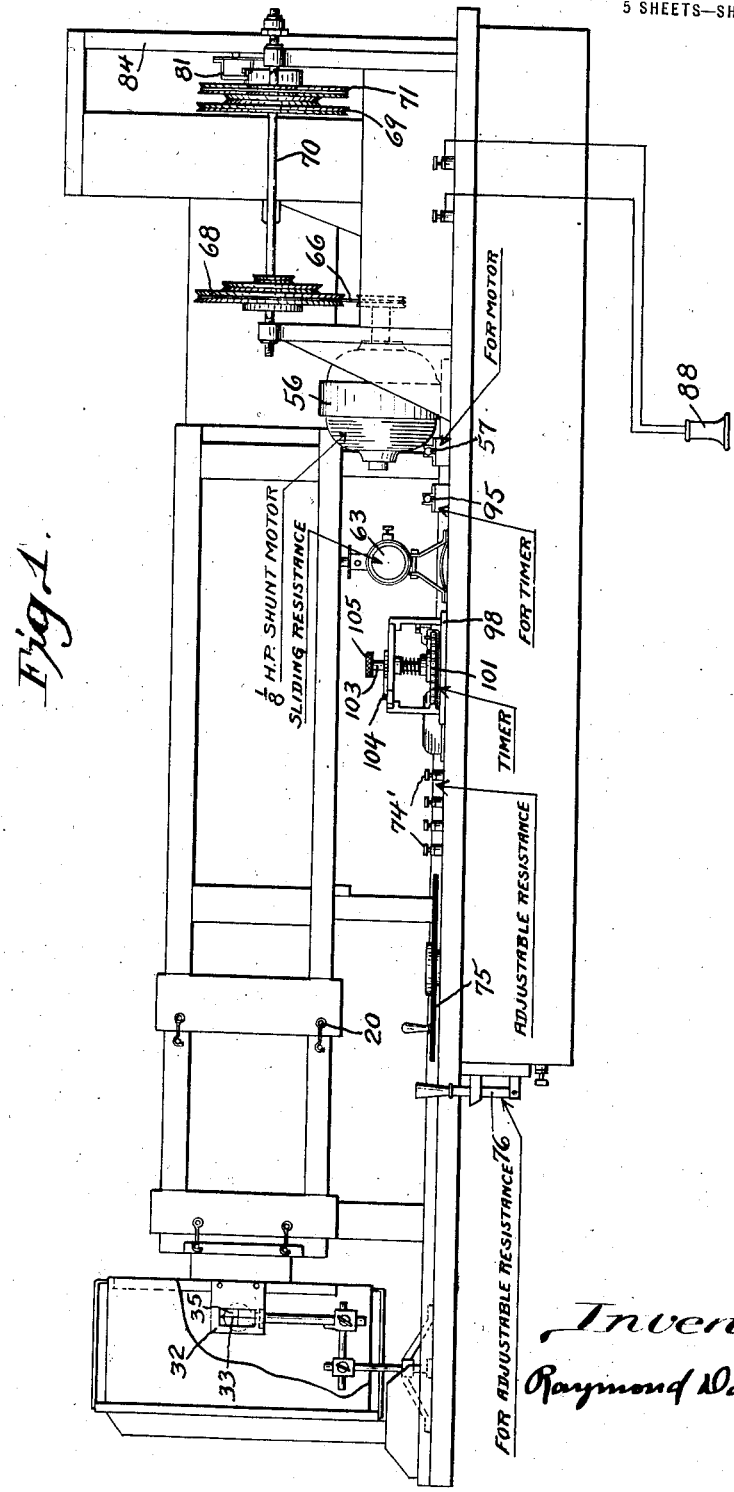

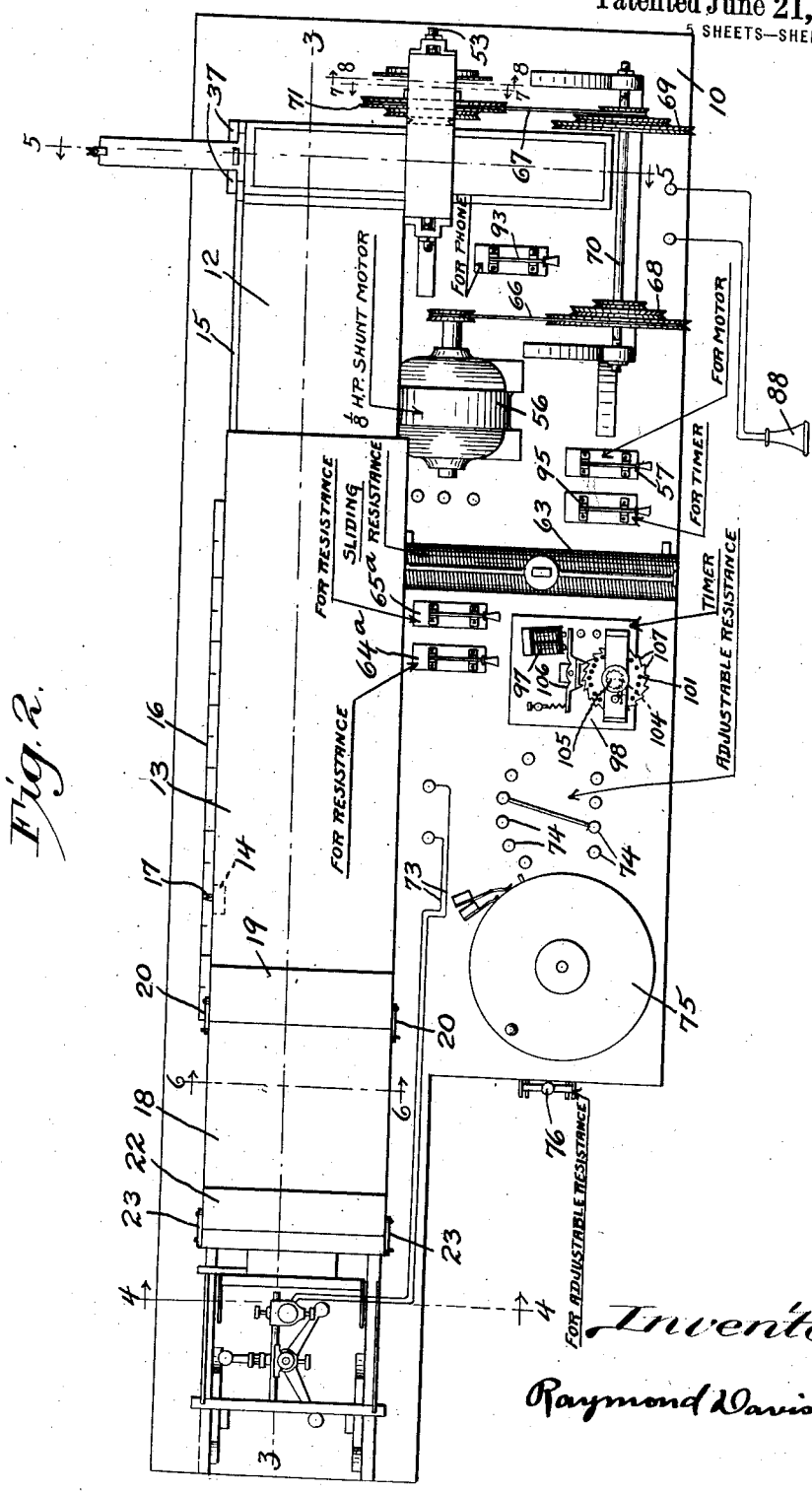

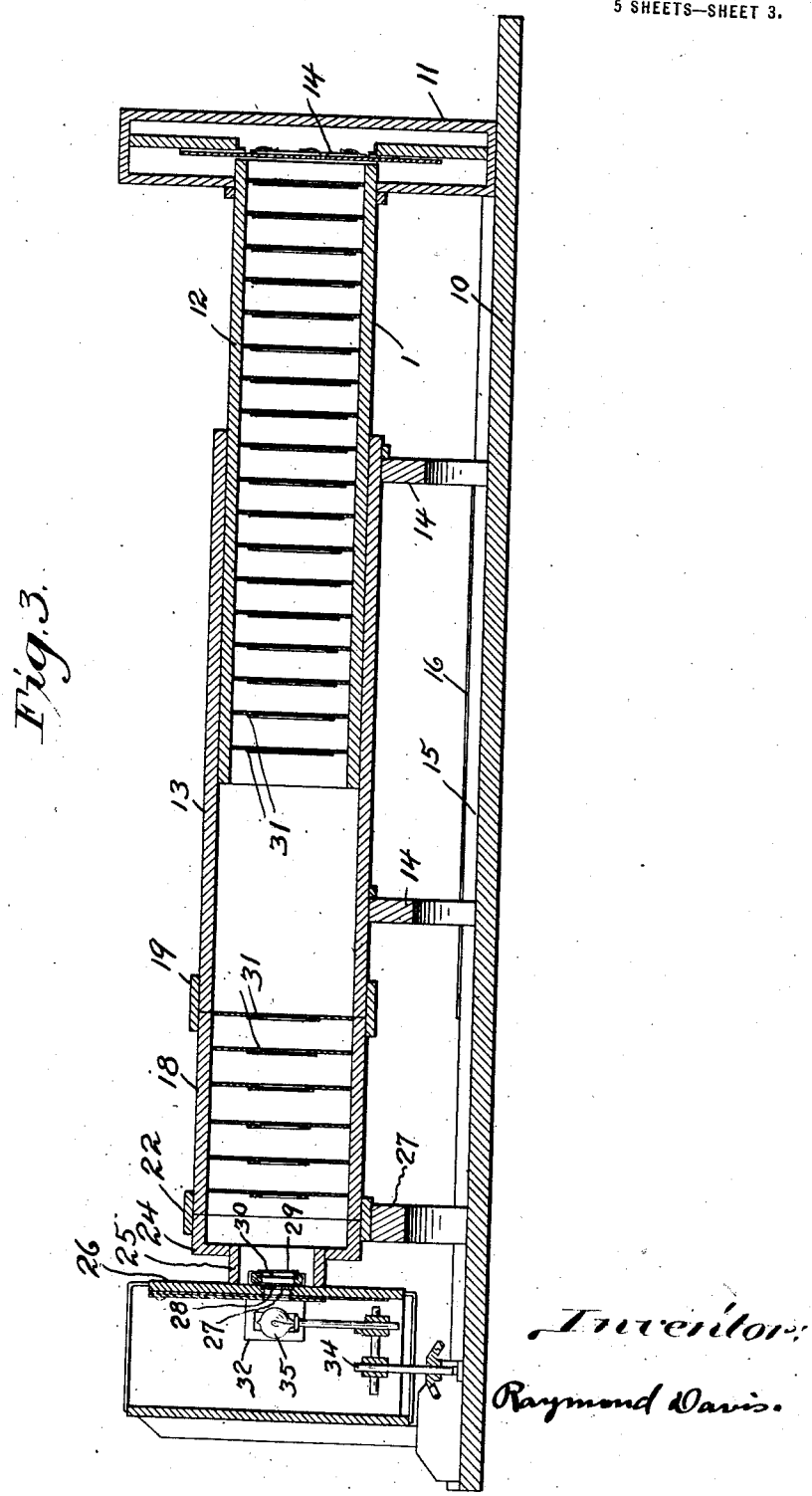

R. DAVIS.
SENSITOMETER FOR TESTING WITH ACCURACY THE SPEED, LATITUDE, AND COLOR SENSITIVITY
OF PHOTOGRAPHIC PLATES AND FILMS.
APPLICATION FILED DEC. 15, 1920.
1,382,272.
Patented June 21, 1921.
5 SHEETS—SHEET 5.
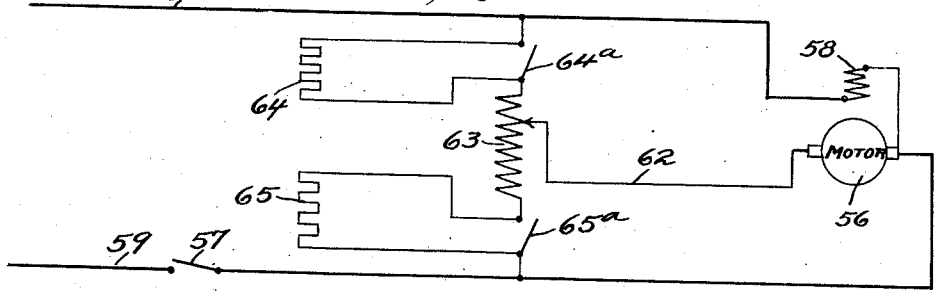
Fig. 10.
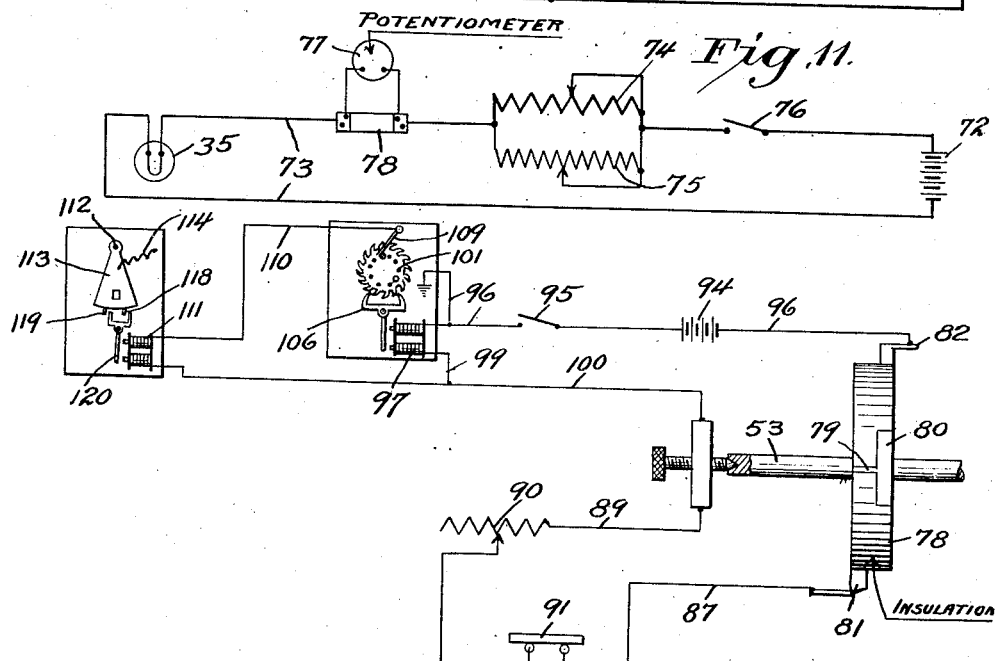
Fig. 11.
Fig. 12.
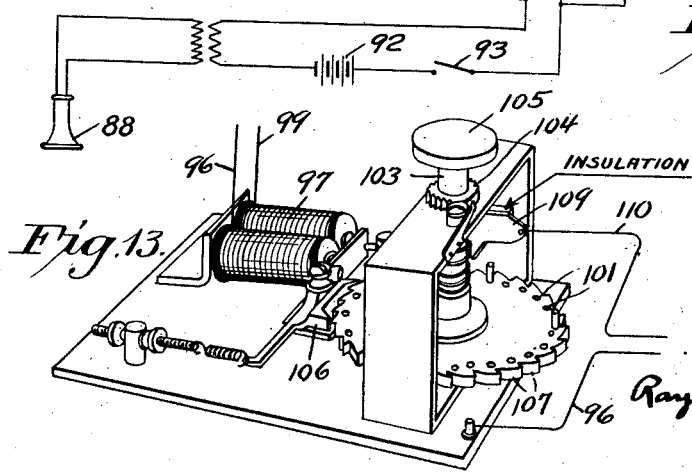
Fig. 13.
Inventor:
Raymond Davis.

UNITED STATES PATENT OFFICE.

RAYMOND DAVIS, OF WASHINGTON, DISTRICT OF COLUMBIA.

SENSITOMETER FOR TESTING WITH ACCURACY THE SPEED, LATITUDE, AND COLOR SENSITIVITY OF PHOTOGRAPHIC PLATES AND FILMS.

1,382,272.

Specification of Letters Patent.  Patented June 21, 1921.

Application filed December 15, 1920.  Serial No. 430,961.

(FILED UNDER THE ACT OF MARCH 3, 1883, 22 STAT. L., 625.)

*To all whom it may concern:*

Be it known that I, RAYMOND DAVIS, a citizen of the United States of America, and an officer of the Government, employed in the photographic laboratory of the Bureau of Standards, in the Department of Commerce, residing in the city of Washington, in the District of Columbia, have invented certain new and useful Improvements in Sensitometers for Testing with Accuracy the Speed, Latitude, and Color Sensitivity of Photographic Plates and Films, of which the following is a specification, reference being had to the acccompanying drawing.

This application is made under the act of March 3, 1883, Chapter 143, 22 Stat. L., 625, and the invention herein described and claimed may be used by the Government of the United States, or any of its officers or employees in the prosecution of work for the Government, or by any other person in the United States, without the payment to me of any royalty thereon.

The principal object of my invention is an improved and accurate sensitometer of the Hurter and Driffield type.

In the use of other types of sensitometers at the present time, no standard of color or intensity of the light falling on the test plates has been adopted, and as the color sensitivity is different with different types and makes of photographic plates and films, and the failure of the reciprocity law of exposure time and light intensity, it is quite clear that workers using sensitometers having different standards of color and light sources of different intensities cannot obtain concordant results. This sensitometer was designed to use the following standards of light:

First. The light falling on the test plate shall have the same spectral energy distribution as that of average noon sunlight at Washington, D. C.

Second. The intensity of the light falling on the test plate shall be one candle meter, visual.

Another source of error is due to what is termed intermittency effect. That is a number of short exposures do not give the same photographic effect as the equivalent continuous exposure.

With the light intensity at one candle meter and of the color specified above, a large majority of the present day dry plates can be tested with as few as 16 interruptions. When this sensitometer is used under these standard conditions no trouble from intermittency effect has been experienced.

This sensitometer is designed to give very accurate total time of exposures, which up to now has not been obtainable with any other seisitometer of the sector wheel type.

In the drawings Figure 1 is a side elevation, a part of the screen for the lamp being shown broken away;

Fig. 2 is a top plan view;

Fig. 3 is a vertical section on the line 3—3, Fig. 2;

Fig. 4 is a section on the line 4—4, Fig. 2, looking in the direction of the arrows;

Fig. 5 is a section on the line 5—5, Fig. 2, looking in the direction of the arrows;

Fig. 6 is a section on the line 6—6, Fig. 2, looking in the direction of the arrows;

Fig. 7 is a section on line 7—7, Fig. 2, looking in the direction of the arrows;

Fig. 8 is a section on line 8—8, Fig. 2, looking in the direction of the arrows;

Fig. 9 is a section on line 9—9, Fig. 8, looking in the direction of the arrows;

Figs. 10 to 12 are wiring diagrams showing the electrical circuits; and Fig. 13 is a perspective view of the timer.

Referring to the drawings, 10 is a base or table upon which, at one end, is rigidly supported a casing 11 having an opening in one of its walls into which is rigidly secured a stationary light tunnel 12 open at both ends. Surrounding and slidable longitudinally on light tunnel 12 is a light tunnel 13 supported on standards 14 guided for longitudnal movement along the base 10 between rails 15 secured thereto. A scale 16 is mounted upon one of the guide rails 15 and a pointer 17 carried upon one of the standards 14 coöperates therewith. Removably secured to one end of light tunnel 13 is a supplementary light tunnel 18, tunnel 13 carrying a flange 19 into which supplemental tunnel fits, whereby a light-tight joint is provided, the two tunnels being detachably secured together by fastenings 20. Supplemental light tunnel 18 is supported on a standard 21 slidable along base 10 between tracks 15 in a manner similar to standards 14. One end of supplementary tunnel 18 is provided with a surrounding flange 22 within which is removably secured, by means of fastenings 23, an extension 24 connected by a tube 25 to a shutter and screen supporting board 26 provided with a central opening 27 in which is mounted a compensating filter 28. A frame 29, adapted to removably support additional light filters 30, is arranged to slide into and out of tube 25. To prevent objectionable reflection of light from the interior walls of tunnels 12 and 18, they are provided with septums 31 having openings progressively increasing in size toward casing 11. The interior walls of tunnels 12 and 18 and the septums 31 are carefully blackened to avoid reflections. Carried on opposite sides of the shutter and screen supporting board 26 are perforated ears 32 supporting cross wires 33. Adjustably supported on standard 34 is an electric lamp 35, the standard and lamp being movable to any desired position along base 10. With the construction thus far described, it is apparent that the distance between casing 11 and light source 35 may be adjusted within the limits imposed by the lengths of light tunnels 12 and 13. If it be desired to bring the light source 35 still closer to casing 11, supplemental tunnel 18 and its support 21 may be removed and extension 24 may then be mounted directly upon the end of tunnel 13.

One side of casing 11 is provided with an opening 36, and with a flange 37 adapted to removably hold a detachable plate holder 38 in light tight relation with its opening 39 in register with opening 36, a slide 40 being provided for closing opening 39 when desired. Within the plate holder 38 is a plate-carrying slide 41 movable along guide ways 42 from the position shown in Fig. 5 into casing 11, within which are provided guide ways 43 arranged so as to act as continuations of guide ways 42 when plate holder 38 is in position on casing 11. Plate-carrying slide 41 is provided with an operating handle 44 hinged at 45 to a rod 46 of the same size and shape, passing through a light-sealed opening in one of the walls of plate holder 38. It will be apparent that, when handle 44 is turned down to a position at right angles to that shown in Fig. 5, plate carrying slide 41 may be pushed into casing 11 or withdrawn therefrom as desired. To hold handle 44 when plate carrying slide 41 is within plate holder 38, a clip 47 is provided upon the exterior of plate holder 38. Plate carrying slide 41 is made of thin sheet metal, and, on its face remote from light tunnel 12, is provided with three frames 48 within which photographic plates may be held by means of clips 50. Plate-carrying slide 41 is cut out to form an opening 51 within each frame 48, these openings 51 being each of a size approximately half the width of the corresponding frame 48. It will thus be apparent that, when photographic plates of a size to fit within frames 48 are placed therein with their sensitive surfaces turned toward plate-carrying slide 41, they will be held in position by clips 50 and approximately half of each plate will be exposed to any light coming through the opening 51 in front of it while the other half of each plate is protected from light by the material of which plate-carrying slide 41 is made. The purpose of thus protecting half of each plate will be explained hereinafter.

Within casing 11, a rotating sector wheel 52 is carried upon a shaft 53. This sector wheel is provided with an opening 54, increasing in angular extent as shown in Fig. 5 by definite steps, each increase being to twice the angular extent of the preceding step, the largest angular extent of the opening being 90°. In the side of the sector wheel opposite opening 54 is formed another opening 55 of 90° angular extent and approximately half the width of the 90° portion of opening 54. It will be seen, from an inspection of Fig. 5, that these two openings are so arranged that one supplements the other so that when sector wheel 52 is rotated, the effect will be the same as if another step, 180° in extent, were added to that part of the opening 54 which is nearest shaft 53. However, to cut out opening 54 to the extent of 180° would greatly weaken the sector wheel while the construction shown is much stronger and the sector wheel is more evenly balanced. Frames 48 and openings 51 are so arranged that, when plate-carrying slide 41 is within casing 11, they will extend radially from shaft 53 and it will be seen, from Fig. 3, that plate-carrying slide 41 occupies a position closely adjacent to sector wheel 52 so that light coming through tunnel 12 will pass through openings 54 and 55 in the sector wheel and opening 51 in plate-carrying slide 41 to sensitive plates 49. It will also be apparent that, during each revolution of sector wheel 52, that end of each plate 49 which is nearer shaft 53 will be exposed for half the time of revolution of the sector wheel, the next section for one-fourth the time of revolution, the next section for one-eighth the time of revolution, etc., each section or band of exposure corresponding to one-half that of the preceding section or band, no matter what may be the speed of rotation of the sector wheel. Suitable means are provided for driving sector wheel 52 at a definite and predetermined desired speed, and, as shown in the drawings, this means is motor 56, which may be started and stopped by means of switch 57. This motor is of the shunt wound direct current type, and for the details of wiring reference is made to Fig. 10 from which it will be seen that the motor field winding 58 is connected directly to line wires 59 and 60, that one wire 61 of the armature circuit is connected directly to line wire 59, and that the other wire 62 of the armature circuit makes sliding contact with resistance element 63 which is connected across line wires 59 and 60 in series with fixed resistance elements 64 and 65, either or both of which may be cut out by closing their respective switches 64ᵃ and 65ᵃ. It will be seen that means are thus provided by which the speed of the motor 56 may be accurately regulated as desired. Motor 56 is connected to the sector wheel 52 by means of belts 66 and 67, stepped pulleys 68 and 69 carried by countershaft 70 and stepped pulley 71 on sector wheel shaft 53.

The circuit of lamp 35 is shown in Fig. 11. I have found that a 6 to 8 volt Mazda C automobile headlight lamp operating on a current of approximately 2.4 amperes is suitable. Lamp 35 is operated by battery 72, and connected in series in lamp circuit 73 are coarse adjustable resistance 74, fine adjustable resistance 75, and switch 76. A potentiometer 77 is also connected in lamp circuit for measuring the current supplied to lamp 35.

The wiring of the microphone and timer circuits is shown in detail in Fig. 12. On the shaft 53 of sector wheel 52 is a disk 78 of insulating material, into which is set a brass contact member 79—80 grounded to shaft 53. An adjustable brush 81 is adapted to make contact with the portion 79 of the contact member and a fixed brush 82 is adapted to make contact with portion 80 of the contact member. Adjustable brush 81 is carried by ring 83, which is mounted on upright 84, from which it is spaced by ring 85 secured to upright 84, and is held in position against said ring by ears 86. One wire 87 of the primary circuit of telephone 88 is connected to adjustable brush 81. The other wire 89 is connected to the bearing for sector wheel shaft 53. An adjustable resistance 90 is interposed in this circuit for adjusting the loudness of the tick in the telephone 88 which occurs when contact 79 closes and opens this circuit once for each revolution of shaft 53. A microphone 91 placed in a seconds-pendulum clock and connected in parallel with contact 79—81 causes the tick of the clock to be also heard in telephone receiver 88. Energy for the telephone circuit is supplied by battery 92 and the telephone circuit is controlled by switch 93.

It will be apparent that, by rotation of ring 83 carrying brush 81, the tick caused by rotation of shaft 53 may quickly be made to coincide with the tick of the clock. The speed of motor 56 may then be adjusted by means of resistances 63, 64, and 65, so that shaft 53 carrying sector wheel 52 will make one revolution per second.

Fixed brush 82 is in circuit through battery 94 and switch 95 interposed in line wire 96 with the electromagnet 97 mounted on the base 98 of a timer hereinafter described, the return wire 99 from said electromagnet being connected to line wire 100 which is connected to the bearing of sector wheel shaft 53. Line wire 96 is also grounded to said base 98 which is made of metal. Upon said base 98 is mounted for rotation a toothed wheel 101 driven by a spring 102 surrounding shaft 103, and having one of its ends attached to said shaft while its other end is attached to toothed wheel 101. A pawl and ratchet 104 are provided for holding the spring wound and also a hand wheel 105 is mounted on shaft 103 to facilitate winding. Revolution of toothed wheel 101 is controlled by escapement 106 connected to the armature of electromagnet 97 whereby the toothed wheel will be allowed to rotate the distance of one tooth for each rotation of sector wheel shaft 53 when switch 95 is closed, toothed wheel 101 moving forward one-half such distance when the circuit is closed and the remaining half of such distance when the circuit is opened as will be readily apparent from the drawing.

Toothed wheel 101 is provided with a series of holes 107, one of these holes being in radial line with each tooth. Into any two of these holes contact pins 108 may be placed. A contact brush 109 is mounted on said base 98 and is insulated therefrom, this brush being adapted to make contact with said pins 108 as they pass thereunder. Brush 109 is connected by means of wire 110 through electromagnet 111 to line wire 100. Electromagnet 111 is mounted upon shutter and screen supporting board 26, upon which is pivoted at 112 shutter 113 actuated in one direction, by spring 114, and having an exposure aperture 115. The distance which such shutter 113 may move in each direction is limited by pin 116 projecting through slot 117. Attached to shutter 113, are two detents, 118 and 119, adapted to be engaged successively by escapement 120 under control of electromagnet 111. It will be apparent that if shutter 113 be set in the position shown in Fig. 4, when the first pin 108 passes under contact brush 109, shutter opening 115 will be brought in register with opening 27 and that escapement 120 will hold the shutter in such open position until the second pin 108 makes contact with brush 109 whereby escapement 120 will be actuated to permit shutter 113 to close under action of spring 114. The time during which shutter 113 will remain open is therefore determined by the distance between contact pins 108 and as toothed wheel 101 advances one notch for each revolution of shaft 53, it follows that, if such shaft be rotating at the speed of one revolution per second and the pins be in adjacent holes, shutter 113 will remain open for one second. If one hole intervenes between the pins 108, shutter 113 will remain open for two seconds and each additional intervening hole will add one second to the time during which the shutter remains open. The operation is as follows: A lamp which has been color matched with a suitable color standard and measured for visual candle power is placed in position and also a suitable compensating filter or filters 28 or 28 and 30 which have been measured for visual transmission are placed in position. The light reaching the test plate from the lamp through the filter has approximately the same spectral distribution as that of average noon sunlight at Washington, D. C. The length of the light tunnel 12, 13, 18 is adjusted to suit the intensity of the lamp to be used, the usual standard of light intensity as set by Hurter and Driffield being one candle meter. The range of adjustment of the light tunnel is from one to two meters in length, therefore a light intensity of four candles (through the compensating filter or filters) may be reduced to one candle meter at the test plate. Switch 76 is then closed, and, by means of potentiometer 77 and resistances 74 and 75 the current through lamp 35 is adjusted to the value for which that particular lamp has been previously calibrated. Shutter 113 is then set in the position shown in Fig. 4 and plate holder 38, which has been previously loaded with three specimens cut from the same plate, or from different plates, is placed in position on casing 11. Slide 40 is then removed and plate-carrying slide 41 is, by means of handle 44, slid into casing 11.

Switch 57 is then closed thereby starting motor 56. Upon closing switch 93 the beat of the seconds pendulum may be heard in telephone 88 and also a click for each revolution of sector wheel shaft 53 caused by the passing of segment 79 under contact brush 81. By turning ring 83, contact brush 81 may be quickly brought to such a position that the tick of the seconds pendulum and the click produced when segment 79 contacts with brush 81 coincide. Then by adjustment of the resistance 63 the speed of the motor may be so adjusted that shaft 53 will make one revolution per second, this speed being indicated by the continued coincidence of the tick of the seconds pendulum and the click above described, both of which are heard through telephone 88.

Fixed brush 82 and contact portion 80 are so positioned that the brush 82 makes contact with contact portion 80 at a time when the openings 54 and 55 of sector wheel 52 are out of register with the apertures in the plate carrying slide 41.

The timer is now set for the desired time of exposure by placing one contact pin 108 in a selected one of holes 107 and a second contact pin 108 in a selected one of the holes 107 following the first pin in the direction of rotation of toothed wheel 101. The apparatus is now ready for making the exposure which is made by closing switch 95. When switch 95 is closed electromagnet 97 will be energized every time sector 80 passes under contact 82 and notched wheel 101 will be permitted, by escapement 106, to advance one tooth for each revolution of shaft 53. As toothed wheel 101 revolves, the first contact pin 108 will pass under contact brush 109, electromagnet 111 will be energized and escapement 120 will permit shutter 113 to open under action of spring 114. Shutter 113 will be held open by escapement 120 until the second pin 108 passes under contact brush 109 whereupon electromagnet 111 will again be energized and escapement 120 will permit shutter 113 to close under action of spring 114. Switch 95 is now opened, plate-carrying slide 41 is withdrawn into plate holder 38 and slide 40 is replaced. Plate holder 38 may now be removed and taken into the dark room where the exposed plates may be removed and developed. One-half of each plate has been protected from exposure as above stated. This unexposed portion is known as the "fog strip" and is used in measuring the density of the silver deposit, the actual density due to exposure being the difference in density between that of the fog strip and that of the exposed portion of the plate. Each plate when developed will show the effect of nine different exposures, each succeeding one of which is twice that of the next preceding one. If it be desired that the longest exposure be one second, the two pins 108 are set with one hole intervening between them. The ratio of exposures will then be 1, .5, .25, .125, .0625, .03125, .015625, .007812, and .003906 seconds, for the exposed portions, and zero exposure for the "fog strip."

I claim—

1. A sensitometer comprising a source of light and a test specimen carrier relatively adjustable toward and from one another and a light tight tunnel coöperating with the two and adjustable in length to correspond with the distance therebetween.

2. A sensitometer comprising a revoluble sector-wheel having graded arcuate openings, a member adjacent said wheel and having an elongated aperture radial with reference to the wheel center so that the openings in the wheel control the admission of light through the aperture, a shutter for controlling the admission of light to the wheel and means for so correlating the movements of the wheel and the shutter that the opening and the closing movements of the shutter occur while the wheel openings are out of register with the aperture.

3. The combination with a sector wheel having graded arcuate openings, of a test-specimen carrier mounted in parallelism with the wheel and having a plurality of elongated apertures radially disposed about the center of the wheel whereby several specimens on the carrier in register with said apparatus may be subjected to exactly the same test.

RAYMOND DAVIS.